United States Patent [19]
Michaels et al.

[11] 3,723,540
[45] Mar. 27, 1973

[54] PREPARATION OF HEXACHLOROPHENE

[76] Inventors: Edwin B. Michaels, Gregory Ct., East Norwalk, Conn. 06855; John W. Lee, Glen Ave., Norwalk, Conn. 06850

[22] Filed: Nov. 26, 1969

[21] Appl. No.: 880,373

[52] U.S. Cl. ............................................. 260/619 A
[51] Int. Cl. ............................................. C07c 37/00
[58] Field of Search ................................. 260/619 A

[56] References Cited

UNITED STATES PATENTS 2,435,593   2/1948   Luthy et al. ...................... 260/619 A
3,426,081   2/1969   Shore et al. ...................... 260/619 A

*Primary Examiner*—Bernard Helfin
*Attorney*—Kenneth S. Goldfarb

[57] ABSTRACT

A novel process is provided for preparing the well known germicidal compound hexachlorophene [i.e., bis-(3,5,6-trichloro-2-hydroxyphenyl)methane] by the condensation of a completely emulsified mixture of two mols of 2,4,5-trichlorophenol and about 1 mol of formaldehyde in the presence of sulfuric acid in concentrations of from above about 80 percent to less than about 92 percent at temperatures ranging from about 5°C. to about 75°C. above the temperatures at which emulsification is effected.

7 Claims, No Drawings

PREPARATION OF HEXACHLOROPHENE

The present invention relates to an improved process for the preparation of the widely employed germicide, bis(3,5,6-trichloro-2-hydroxyphenyl)methane which hereinafter may be termed "hexachlorophene." More particularly, it relates to a process for preparing hexachlorophene from the emulsion condensation of a mixture of 2,4,5-trichlorophenol, a formaldehyde-yielding substance and an acid condensing agent under controlled acid concentration conditions. Still more particularly, it relates to an improved process for preparing hexachlorophene directly by the emulsion condensation, in the presence of hereinafter defined proportions of a dispersed mixture of (a) 2,4,5-trichlorophenol either in its pure or impure form, (b) a formaldehyde substance, such as formaldehyde or paraformaldehyde and (c) sulfuric acid, being concentrated of from above about 80 percent to less than about 92 percent at a temperature of from about 5°C. to about 75°C. above an emulsification temperature of at least about 65°C., whereby there is recovered insolubilized solid hexachlorophene in good yield and purity.

As is known, the condensation reaction for the preparation of hexachlorophene involving 2 mols of 2,4,5-trichlorophenol and 1 mol of formaldehyde to obtain bis-(3,5,6-trichloro-2-hydroxyphenyl)methane is extremely difficult to control, frequently resulting in resinous, tarry by-products. To obviate these difficulties, various attempts have been made to control the condensation reaction. One method involves the use of relatively low temperatures (usually from zero degrees to about 20°C.) and large volumes of sulfuric acid. Another method suggests the use of high temperatures (usually above 130°C.) and low volumes of sulfuric acid. Still another method contemplates the use of halogenated hydrocarbons as a reaction menstruum. In essence, all the reactions involve solid or liquid phase condensation reactions which remain difficult to control resulting in incomplete reactions and in the formation of difficult-to-remove by-products. If a process could be provided for effecting the condensation of trichlorophenol and formaldehyde absent tarry or other by-product formation and unreacted trichlorophenol, a long-felt need in the art would be satisfied.

It is, therefore, a principal object of the invention to provide an economical process for effecting the complete or total condensation of a trichlorophenol and formaldehyde absent substantial by-product formation. It is a further object of the invention to effect the said condensation of a trichlorophenol and formaldehyde in a liquid phase with resulting subsequent production of a substantially pure solid phase. Other objects and advantages will become apparent from a reading of the description hereinafter set forth.

To this end, it has been unexpectedly found that the condensation of trichlorophenol and formaldehyde proceeds smoothly and in a controlled fashion when the reactants are completely emulsified with sulfuric acid or hereinafter defined concentration as the continuous phase prior to condensation. Absent complete emulsification, there is not formed by condensation the desired product which is substantially free from tarry products or other impurities.

According to the process of the invention, there is dispersed formaldehyde in 2,4,5-trichlorophenol at a temperature above the melting point of the trichlorophenol but below about 90°C. At the latter elevated temperature the dispersed mixture is emulsified completely in the presence of sulfuric acid having a concentration of at least about 80 percent but less than about 92 percent. The so-completely emulsified dispersion is next condensed at a temperature of from 5° to 75°C. above the emulsification temperature to form a granular dispersion. The condensation reaction is thereafter terminated when the granular dispersion no longer forms. Granules of bis-(3,5,6-trichloro-2-hydroxyphenol)methane are recovered in good yield and purity.

In general, there are admixed 100 parts, by weight, of 2,4,5-trichlorophenol and a formaldehyde substance as, for instance, formaldehyde per se, formalin or paraformaldehyde in amounts sufficient to provide or yield from 8 to 9 parts of formaldehyde, based on the weight of the phenol reactant, to form a dispersion at a temperature maintained above the melting point of the phenol, namely, above about 65°C. but below about 90°C. either in the presence or absence of sulfuric acid of concentrations between about more than 80 percent and less than about 92 percent. Usually the amounts present range from about 50 percent to 90 percent, by weight, based on the weight of the phenol. In the absence of added sulfuric acid, dispersion of the reactants is efficiently effected when carried out at temperatures of about 85°C. Usually, the dispersion is vigorously agitated to ensure complete dispersion.

Emulsification is effected when at least 100 percent or at least 100 parts of the acid per 100 parts of the phenol is added to form a milky-white stirrable mixture. Complete emulsification is attained when from 100 to 250 percent of the sulfuric acid, based on the weight of the phenol, is slowly added, usually from 5–30 minutes. The acid forms the continuous phase, whereas the 2,4,5-trichlorophenol and formaldehyde form the dispersed phase therein. The temperature during emulsification is maintained at least above the melting point of the trichlorophenol but below about 90°C.

Upon completion of the sulfuric acid addition, an exotherm is noted indicating that the desired condensation is taking place. This exotherm is usually some 5° to 40° C. higher than the temperature of the emulsification operation. However, additional external heat may be required to provide temperatures ranging from 5°C. to 75°C. above the emulsification operation to complete the condensation. It is noted that, in the environment of the condensation reaction, the emulsion is broken and a granular dispersion appears which, upon completion of the condensation reaction, precipitates as finely-divided granules. These granules are readily recovered from the latter mixture and analyze as: bis-(3,5,6-trichloro-2-hydroxyphenyl) methane in good yield and purity.

Advantageously, the granules in the latter dispersion may be treated by well-known procedures. For instance, there is added to the latter granular solids any suitable sufficient alkaline solution until a pH of from about 12 to about 13.5 is attained. Occluded sulfuric acid is neutralized. Resultant solubilized mixture is next acidified with a suitable reagent, such as sulfuric acid or sodium bicarbonate, to obtain a pH between about 9.5 and about 10. So-formed salt of desired product precipitates out of the latter solution wherein dissolved impurities remain undisturbed therein. Separating and acidifying the latter salt, substantially white crystals of bis-(3,5,6-trichloro-2-hydroxyphenyl) methane in yields ranging from 90 to 95 percent or higher, having a melting point between 161° and 168°C. are obtained.

It has been found that, unless complete emulsification of the reactants prior to condensation is attained as evidenced by the formation of a milky-white stirrable mixture, side reactions occur resulting in products other than the desired condensed product. Complete emulsification is achieved surprisingly by maintaining a temperature below the exotherm at which condensation will occur. If necessary, external cooling means should be provided. However, in most instances a temperature above the melting point of the 2,4,5-trichlorophenol reactant, namely, between about 65° and 75°C. will provide the temperature necessary to attain complete emulsification. Where the trichlorophenol and formaldehyde are dispersed at temperatures of say from 85° to 90°C., then the addition of the sulfuric acid will cool the dispersion to a temperature between about 65°C. and about 85°C. and an emulsion will form in which the trichlorophenol and formaldehyde are completely dispersed in the continuous sulfuric acid phase absent the occurrence of any reaction during emulsification.

On completion of the emulsification operation, a rise in temperature of from about 5° to 40° C. is generally observed. This temperature rise is caused by the substantially sole condensation reaction which commences to occur.

Emulsification of dispersed trichlorophenol and formaldehyde reactants in a continuous sulfuric acid phase is a critical aspect of the process of the invention. It is, therefore, essential to provide sulfuric acid in the concentration and amounts which will achieve such emulsification in an economical and straightforward manner. In general, the concentration of the sulfuric acid is above about 80 percent but below about 92 percent, preferably between about 83 and 90 percent. The amount to be added is generally some 1 to 2 ½ times the weight of the trichlorophenol reactant. Where concentrations of acid in the higher range are selected, say from 86 to 90 percent, the temperature during emulsification should not exceed about 85°C. to ensure complete emulsification prior to the condensation operation. Where concentrations in the lower range are selected, say from about 83 to 85 percent the temperature during emulsification can be maintained at about 90°C. to ensure complete emulsification. It is, therefore, of critical significance that complete emulsification of the dispersed reactants occurs prior to the condensation reaction in the process of the invention. In this manner can the liquid phases be controlled during condensation to avoid substantial formation of said by-products and to form desired granular particles of bis-(3,5,6-trichloro-2-hydroxyphenyl)methane directly in good yield and purity.

To further clarify an understanding of the invention, the following examples are presented for purposes of illustration and are not to be construed as limiting in any way the scope of the invention. All parts are by weight, except as otherwise stated.

EXAMPLE 1

This example illustrates the dispersion of reactants in sulfuric acid.

To a suitable reaction vessel equipped with thermometer and agitator are added 100 parts of 2,4,5-trichlorophenol, 8.4 parts of paraformaldehyde, and 14 parts of water under agitation at a temperature between 63° and 65°C. There is next slowly added 80 parts of 93 percent sulfuric acid over a thirteen minute period with attendant rise in temperature to 75°C. and the paraformaldehyde is decomposed to formaldehyde. This rise is due to the heat of dilution caused by the addition of the concentrated 93 percent sulfuric acid. The resultant dispersion is agitated for from 5 to 10 minutes to completely decompose the paraformaldehyde to formaldehyde. To the latter is slowly added 120 parts of 93 percent sulfuric acid while maintaining the temperature of the mixture at 75°C. The final concentration of the added sulfuric acid is 86 percent due to the presence of 14 parts of water initially added. Resultant thick, creamy stirrable mixture indicates completion of the emulsification stage.

Shortly after all the sulfuric acid has been added to effect emulsification, there is noted a temperature increase to 82°C. with concurrent breaking of the emulsion and formation of a granular dispersion. The latter is held for an additional hour to ensure completion of the condensation stage.

The reaction mixture is next quenched with water and granules of bis-(3,5,6-trichloro-2-hydroxyphenyl)methane precipitate. This precipitate is next digested in water, filtered and recovered in 99 percent yield, based on the trichlorophenol reactant, and having a melting point of about 161.5°C.

EXAMPLE 2

The process of Example 1 is repeated in every detail except that subsequent to the condensation stage, the granular dispersion held for 1 hour is then quenched in water and extracted with xylol as the solvent for the bis-(3,5,6-trichloro-2-hydroxyphenyl)methane. The latter organic layer is separated from a water layer and decolorized with clay. Finally, the solvent is evaporated to recover an overall 97 percent yield of desired bis-(3,5,6-trichloro-2-hydroxyphenyl) methane having a melting point of 163°C.

EXAMPLE 3

This example illustrates the dispersion of formaldehyde in molten 2,4,5-trichlorophenol, prior to addition of dilute or 86 percent sulfuric acid.

To a suitable reaction vessel equipped with stirrer and thermometer are admixed at a temperature of 85 °C., 100 parts of 2,4,5-trichlorophenol and 8.2 parts of formaldehyde in the form of a powder. There is next added over a twenty minute period, with agitation, 189 parts of 86 percent sulfuric acid with an attendant slight drop in temperature to 84°C. A milky white-thick emulsion is formed.

Within about 10 minutes, with continued stirring, an exotherm is noted. The temperature rose to 100°C. indicating that condensation has occurred with attendant breaking of the emulsion and formation of a granular dispersion in which granules precipitated.

The precipitate is readily recovered by centrifuging and washing the latter mixture to recover about 102 parts of desired condensate having a melting point of 161°C.

EXAMPLE 4

Repeating the procedure of Example 3 in every detail except that subsequent to condensation stage, the granular dispersion is held in the reactor for about one hour and then quenched in water. The desired bis-(3,5,6-trichloro-2-hydroxyphenyl)methane is extracted from the water-quenched mixture with toluol as the solvent for the bis-methane. The latter extracted organic layer is separated from the water layer and decolorized with clay. The solvent is finally evaporated to recover 97 percent yield of bis-(3,5,6-trichloro-2-hydroxyphenyl) methane having a melting point of 163.3°C.

EXAMPLE 5

The procedure of Example 3 is repeated in substantially every detail except that 207 parts of 90 percent sulfuric acid is substituted for the 189 parts of 86 percent sulfuric acid.

Bis-(3,5,6-trichloro-2-hydroxyphenyl)methane is recovered in good yield and purity.

EXAMPLE 6

To a suitable reaction vessel equipped with thermometer and stirrer are added 100 parts of 2,4,5-trichlorophenol, 8.4 parts of paraformaldehyde and 25 parts of water and mixed at 70°C. There is next added over a 25 minute period 175 parts of 93 percent sulfuric acid whose concentration ultimately is 81 percent. The temperature rose to 95°C. due to the heat of dilution because of the addition of concentrated sulfuric acid to form a completed emulsion.

Within about 45 minutes with continued stirring and heating an exotherm is noted. The temperature rose to 128°C. indicating that condensation has occurred with attendant breaking of emulsion and the formation of a granular dispersion in which granules precipitate.

Recovery of the granules is effected by centrifuging the latter mixture, thereby recovering about 93 parts of desired condensate having a melting point of 160°C.

Similar results are noted where formaldehyde is substituted for paraformaldehyde in the above example.

EXAMPLE 7

This example illustrates the utilization of 93 percent sulfuric acid.

To the apparatus of Example 6 above, there are added with agitation 100 parts of 2,4,5-trichlorophenol and 8.4 parts of paraformaldehyde at a temperature of 64°C. To the latter dispersion is next added 150 parts of 93 percent sulfuric acid over a 13 minute period. The temperature rose to 75°C. and maintained at the latter temperature. Solidification of the entire reaction mixture occurred.

The solidified mixture is quenched in water and then treated with 100 parts of xylol. Extraction of the organic phase is separated from the aqueous phase and, upon distillation of the organic solvent, an impure product having a melting point of about 155°C. is obtained.

We claim:
1. In a process for preparing bis-(3,5,6-trichloro-2-hydroxyphenyl)methane by condensing 2,4,5-trichlorophenol with a formaldehyde-yielding substance, the improvement which comprises the steps of:
   a. effecting dispersion of a mixture consisting essentially of 100 parts of 2,4,5-trichlorophenol, by weight, and a formaldehyde material present in amounts yielding from 8 to 9 parts of formaldehyde, based on the weight of the said trichlorophenol at a temperature above the melting point of 2,4,5-trichorophenol but below about 90°C.,
   b. emulsifying completely said dispersion to a milky-white stirrable mixture by the slow addition of sulfuric acid as the continuous phase therein and having a concentration of at least about 80 percent sulfuric acid but less than about 92 percent sulfuric acid,
   c. condensing the said emulsified dispersion at a temperature ranging from about 5° to about 75°C. above the said emulsification stage,
   d. terminating the latter condensation when a granular dispersion no longer forms, and
   e. thereafter recovering therefrom as substantially pure granules, bis-(3,5,6-trichloro-2-hydroxyphenyl)methane, said sulfuric acid being present in overall amounts ranging from 100 parts to about 250 parts, based on the weight of the said 2,4,5-trichlorophenol reactant.

2. A process according to claim 1 wherein the dispersion of the mixture of 2,4,5-trichlorophenol and formaldehyde material is attained at a temperature ranging from 65° to 85°C. in the presence of slowly added sulfuric acid having a concentration of at least about 80 percent but less than 92 percent sulfuric acid, whereby a milky white stirrable mixture is formed.

3. A process according to claim 2 wherein the formaldehyde material is paraformaldehyde.

4. A process according to claim 2 wherein the said dispersion is attained in 80 parts, by weight, of sulfuric acid, completely emulsifying said mixture and condensing said emulsion in the presence of an additional 120 parts by weight of sulfuric acid, the final concentration of sulfuric acid being 86 percent.

5. A process according to claim 4 in which the final sulfuric acid concentration is 81 percent.

6. A process according to claim 1 wherein the dispersion of the mixture 2,4,5-trichlorophenol and formaldehyde material is carried out at a temperature above the melting point of said 2,4,5-trichlorophenol in the absence of said sulfuric acid, completely effecting emulsification of the dispersed reactants in said sulfuric acid and thereafter condensing said emulsified mixture to recover desired granules.

7. A process according to claim 6 in which the formaldehyde material is paraformaldehyde.

* * * * *